(12) United States Patent
Laitinen

(10) Patent No.: US 8,107,623 B2
(45) Date of Patent: Jan. 31, 2012

(54) METHOD FOR VERIFYING A FIRST IDENTITY AND A SECOND IDENTITY OF AN ENTITY

(75) Inventor: Pekka Laitinen, Helsinki (FI)

(73) Assignee: Nokia Corporation, Espoo (FI)

( * ) Notice: Subject to any disclaimer, the term of this patent is extended or adjusted under 35 U.S.C. 154(b) by 803 days.

(21) Appl. No.: 10/871,701

(22) Filed: Jun. 21, 2004

(65) Prior Publication Data
US 2005/0246548 A1 Nov. 3, 2005

(30) Foreign Application Priority Data
Apr. 30, 2004 (GB) .................................. 0409704.4

(51) Int. Cl.
*H04L 9/00* (2006.01)
*H04L 9/30* (2006.01)
*H04K 1/00* (2006.01)

(52) U.S. Cl. .......... 380/30; 713/182; 713/176; 713/156; 713/169; 380/247; 380/270; 380/279; 380/286; 455/411

(58) Field of Classification Search ............... 380/30, 380/247, 270, 279, 286; 713/182, 176, 156, 713/169; 455/411
See application file for complete search history.

(56) References Cited

U.S. PATENT DOCUMENTS

| | | | | |
|---|---|---|---|---|
| 5,675,649 | A * | 10/1997 | Brennan et al. | 380/286 |
| 6,516,414 | B1 * | 2/2003 | Zhang et al. | 713/176 |
| 6,785,713 | B1 * | 8/2004 | Freeman et al. | 709/208 |
| 7,107,248 | B1 * | 9/2006 | Asokan et al. | 705/67 |
| 7,171,555 | B1 * | 1/2007 | Salowey et al. | 713/156 |
| 7,610,619 | B2 | 10/2009 | Kastelewicz | |
| 2002/0016770 | A1 * | 2/2002 | Flenley et al. | 705/43 |
| 2003/0056099 | A1 | 3/2003 | Asanoma et al. | |
| 2003/0105876 | A1 * | 6/2003 | Angelo et al. | 709/237 |
| 2003/0166398 | A1 * | 9/2003 | Netanel | 455/410 |
| 2003/0233454 | A1 * | 12/2003 | Alkhatib et al. | 709/226 |
| 2004/0153667 | A1 | 8/2004 | Kastelewicz | |
| 2005/0050362 | A1 * | 3/2005 | Peles | 713/201 |
| 2005/0102501 | A1 * | 5/2005 | Haukka et al. | 713/155 |
| 2005/0282521 | A1 * | 12/2005 | Hermann et al. | 455/410 |
| 2007/0050623 | A1 | 3/2007 | Huang | |

FOREIGN PATENT DOCUMENTS

| | | |
|---|---|---|
| EP | 1365620 | 11/2003 |
| JP | 03-073633 | 3/1991 |
| WO | WO 03/005669 A1 | 1/2003 |

(Continued)

OTHER PUBLICATIONS

Haukka, Tao. "3GPP TSG SA WG3 Security". Feb. 25-28, 2003. http://www.3gpp.org/ftp/tsg_sa/WG3_Security/TSGS3_27_Sophia_Antipolis/Docs/PDF/S3-030171.pdf.*

(Continued)

*Primary Examiner* — Edan Orgad
*Assistant Examiner* — Kari Schmidt
(74) *Attorney, Agent, or Firm* — Mintz, Levin, Cohn, Ferris, Glovsky and Popeo, P.C.

(57) ABSTRACT

A method for verifying a first identity and a second identity of an entity, said method comprising: receiving first identity information at a checking entity; sending second identity information from the entity to said checking entity; verifying that the first and second identities both belong to said entity; and generating a key using one of said first and second identity information.

34 Claims, 1 Drawing Sheet

FOREIGN PATENT DOCUMENTS

| WO | WO 03/081431 A1 | 10/2003 |
| WO | 2005/074188 | 8/2005 |

OTHER PUBLICATIONS

3rd Generation Partnership Project; Technical Specification Group Services and System Aspects: Generic Authentication Architecture (GAA) Generic Bootstrapping Architecture (Release 6). Mar. 2004.*

3GPP TS 33.220 v6.0.0, "*3rd Generation Partnership Project; Technical Specification Group Services and System Aspects; Generic Authentication Architecture (GAA); Generic Bootstrapping Architecture (Release 6)*", Mar. 24, 2004, pp. 1-18.

Garcia, M. et al., "*3GPP Requirements on SIP*", IETF Standard-Working-Draft, Internet Engineering Task Force, IETF, XP015013488, Nov. 2001, p. 33.

Second Office Action issued by the State Intellectual Property Office dated Dec. 18, 2009, issued in connection with counterpart Chinese application No. 200580011278.8.

Office Action dated Jan. 29, 2010, issued by the Japanese Patent Office, issued in connection with counterpart Japanese patent application No. 2007-502442.

First Office Action dated Jun. 5, 2009, issued by the State Intellectual Property Office (SIPO) of the People's Republic of China, in connection with counterpart application 200580011278.8 (English translation included).

3GPP TS 29.228, V5.7.0, 3rd Generation Partnership Project; Technical Specification Group Core Network; IP Multimedia (IM) Subsystem Cx and Dx interfaces; Signalling flows and message contents (Release 5), Mar. 2004.

3GPP TS 29.109, V6.0.0, 3rd Generation Partnership Project; Technical Specification Group Core Network; Generic Authentication Architecture (GAA); Zh and Zn Interfaces based on the Diameter protocol; Stage 3 (Release 6), Sep. 2004.

* cited by examiner

METHOD FOR VERIFYING A FIRST IDENTITY AND A SECOND IDENTITY OF AN ENTITY

FIELD OF THE INVENTION

The present invention relates to verifying the identities of a network entity.

BACKGROUND OF THE INVENTION

The current development towards truly mobile computing and networking has brought on the evolution of various access technologies, which also provide the users with access to the Internet when they are outside their own home network. The first public communication network that provides a truly ubiquitous World Wide Web (WWW) access is the GSM-based mobile telephone network.

So far, the use of the Internet has been dominated by person-to-machine communications, i.e. information services. The evolution towards the so-called third generation (3G) wireless networks brings along mobile multimedia communications, which will also change the way IP-based services are utilized in public mobile networks. The IP Multimedia Subsystem (IMS), as specified by the by the $3^{rd}$ Generation Partnership Project (3GPP), integrates mobile voice communications with Internet technologies, allowing IP-based multimedia services to be utilized in mobile networks.

The inventors have identified an important problem with mobile multimedia communications in third generation wireless networks, namely that of identity coherence checking in the so-called third generation Generic Authentication Architecture GAA. This is for example described in the Technical specification TS 33.220v6.

The new multimedia capable mobile terminals (multimedia phones) provide an open development platform for application developers, allowing independent application developers to design new services and applications for the multimedia environment. The users may, in turn, download the new applications/services to their mobile terminals and use them therein.

GAA is to be used as a security procedure for a plurality of future applications and services. However, the inventors have identified a flaw in GAA.

In particular, in GAA there is a need for a bootstrapping server function (BSF) to be able to verify a binding between a public identifier of a network application function (NAF) and the GAA internal identifier of the NAF. The public identifier of the NAF is the public host name of the NAF that the user equipment (UE) uses in the Ua interface. The internal NAF identifier is the network address that is used in the corresponding DIAMETER messages in the Zn interface. The public NAF identifier is needed in the boot strapping function because the bootstrapping server function uses it during the derivation of the NAF specific key (Ks_NAF).

This problem is more pronounced if the NAF is doing virtual name based hosting, that is having multiple host names mapped on to a single IP (internet protocol) address. Thus, there may be one-to-many mapping between the internal NAF address and the public NAF addresses. The domain name server is not able to verify that a certain NAF address identified by a certain internal NAF address in the bootstrapping server function is authorised to use a certain public NAF address.

Embodiments of the present invention seek to address the above-described problems.

SUMMARY OF THE INVENTION

According to an embodiment of the present invention there is provided a method for verifying a first identity and a second identity of an entity, said method comprising: receiving first identity information at a checking entity; sending second identity information from the entity to said checking entity; verifying that the first and second identities both belong to said entity; and generating a key using one of said first and second identity information.

According to another embodiment of the present invention there is provided a method for verifying an external interface address and an internal interface address of a network application function, comprising the steps of: receiving the internal interface address at a boot strapping function from user equipment; receiving the external interface address at the boot strapping function from the network application function; and verifying that the external interface address and the internal interface address belong to the same network application function.

According to another embodiment of the present invention there is provided a system comprising a checking entity arranged to receive a first identity of an entity at a checking entity; said entity arranged to send a second identity of the entity from the entity to said checking entity, said checking entity being arranged to verify that the first and second identities both belong to said entity and to generating a key from one of said first and second identities.

According to another embodiment of the present invention there is provided a checking entity arranged to receive a first identity of an entity and a second identity of the entity, said second entity identity being received from the entity, said checking entity being arranged to verify that the first and second identities both belong to said entity and to generating a key from one of said first and second identities.

According to an embodiment of the present invention there is provided an entity comprising a first and second identity, said entity arranged to send the second identity to a checking entity and to receive a key generated from said second identity from the checking entity.

BRIEF DESCRIPTION OF THE DRAWINGS

For a better understanding of the present invention and as to how the same may be carried into effect, reference will now be made by way of example to the accompanying drawings in which.

DETAILED DESCRIPTION OF PREFERRED EMBODIMENTS OF THE INVENTION

Figure 1:
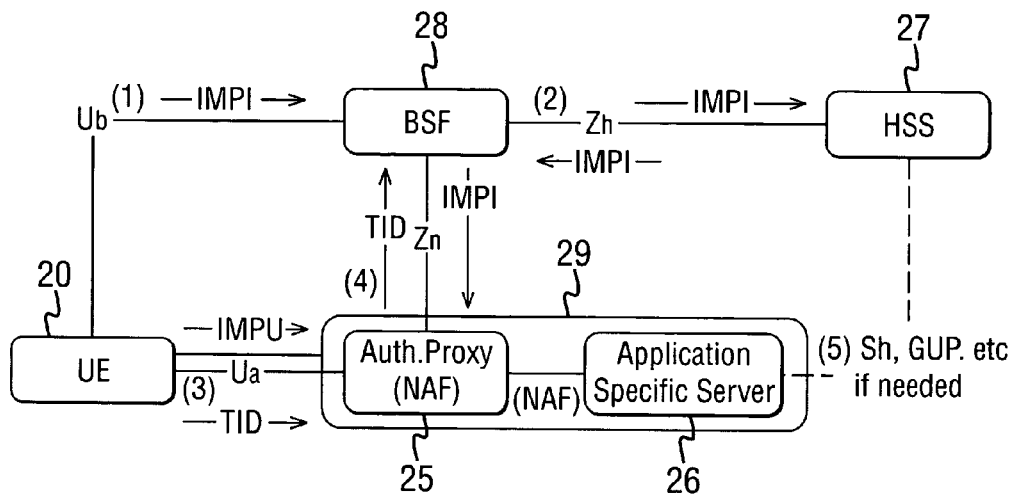
FIG. 1 shows an overview of GAA applications.

Reference is made to FIG. 1 which shows a GAA architecture in which embodiments of the present invention may be incorporated.

User equipment UE 20 is provided. The user equipment can take any suitable form and may for example be a mobile telephone, personal organiser, computer or any other suitable equipment. The user equipment 20 is arranged to communicate with a bootstrapping server function BSF 28 via a Ub interface. The user equipment 20 is also arranged to communicate with a network application function NAF 29 via a Ua interface.

The network application function 29 may be divided to an authorisation proxy function 25 and an application specific server 26. The network application function 29 is connected to the bootstrapping server function 28 via a Zn interface.

The bootstrapping server function 28 is connected to a home subscriber system HSS 27 via a Zh interface. The bootstrapping server function and the user equipment are arranged to mutually authenticate using the AKA (authentication and key agreement) protocol and agree on session keys that afterwards are applied between the user equipment and network application function. Once the bootstrapping procedure has been completed, the user equipment and the NAF can run some application specific protocol where the authentication of messages will be based on those session keys generated during the mutual authentication between the user equipment and bootstrapping server function using the Ub interface. Generally, there will be no previous security association between the user equipment and the NAF. The NAF shall be able to locate and communicate securely with a subscriber's bootstrapping server function. The NAF shall be able to acquire shared key material or NAF specific key material derived from this shared key material that is established between the user equipment and the BSF during the bootstrapping procedure over Ub interface. The NAF is arranged to check the lifetime of the shared key material.

In addition to its normal function, the HSS stores parameters in the subscriber profile relating to the bootstrapping server function. Optionally, parameters relating to the usage of some NAF'sare stored in the HSS.

The interfaces will be described in more detail. The Ua interface carries the application protocol which is secured using the key material or derived key material agreed between the user equipment and the base station function as a result of the run of HTTP digest AKA over the Ub interface.

The Ub interface provides mutual authentication between the user equipment and the bootstrapping server function. It allows the user equipment to bootstrap the session keys based on the 3GPP AKA infrastructure.

The Zh interface protocol used between the BSF and HSS allows the BSF to fetch the required authentication information and subscriber profile information from the HSS. The interface to the 3G authentication centre is HSS internal.

The Zn interface is used by the NAF to fetch the key material or derived key material agreed during a previous HTTP digest AKA protocol run over the Ub interface from the BSF. It can also be used to fetch NAF specific subscriber profile information from the BSF.

In summary, in embodiments of the present invention, the NAF 29 sends the public identifier of the NAF to the bootstrapping server function 28. The bootstrapping server 25 function shall verify the binding between the public and internal NAF identities. The public NAF identifier is used by the BSF to derive the NAF specific key (Ks_NAF) from master key material (Ks) established during bootstrapping procedure in the Ub interface. In particular, embodiments are the present invention are applicable where the network element that is hosting a NAF has one or more network interfaces used for serving incoming connections from the user equipment. This is the public (or external) network interface and is via the Ua interface. One network interface is for connecting to operator services such as the BSF, that is the internal network interface which is via the Zn interface between the NAF 29 and BSF 28.

The address of the internal network interface in the Zn interface is added for example to the "origin-host" field b the NAF in the DIAMETER message. Embodiments of the present invention convey the external network interface address of the NAF, that is the public address to the BSF from the NAF. This can be done using an AVP (attribute value pair) to transport the information from the NAF 29 to the BSF. As mentioned previously, the external or public address is used by the BSF because the BSF derives the NAF specific key (Ks NAF) from the fully qualified domain name (FQDN) of the NAF which the user equipment uses, that is the public address of the NAF. The BSF checks that the NAF identified by the internal address used in the Zn interface (NAF_id_Zn) is authorised to use the external address used in the Ua interface (NAF id Ua).

In embodiments of the invention, the NAF sends the NAFIdUa in the first message, and receives confirmation (or error) message as response. The UID may or may not be transferred at the same time. The corresponding responses may thus only relate to the mapping of the public and internal NAF identifiers. In embodiments of the invention, both the public and internal NAF identifiers are sent to the BSF, the BSF checks the mapping between them, and derives the NAF specific key using the public NAF identifier.

Figure 2:
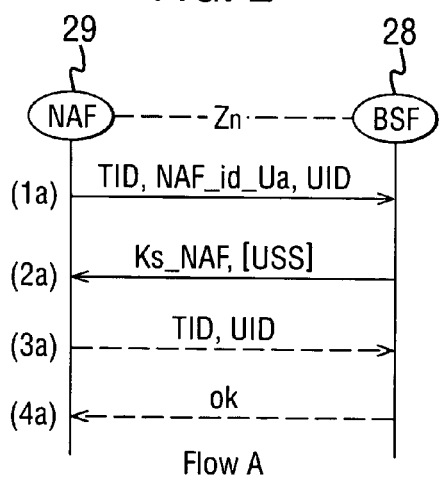
FIG. 2 shows a first signal flow in one embodiments of the invention.

Reference is now made to FIG. 2 which shows a first signal flow in one embodiment of the present invention. FIG. 2 shows messaging details between the NAF 29 and BSF 28 via the Zn interface. Before the Zn interface messaging takes place, the user equipment has requested a service from the NAF over the Ua interface. With this request, the user equipment has given a TID (transaction identifier) and possibly a user identifier UID. The user identifier can be transported from the user equipment to the NAF in later messages. FIG. 2 describes the case where the TID and UID have been sent from the user equipment to the NAF in the same message.

In step 1a, the NAF 29 sends the TID, the NAF_id_UA and UID to the BSF 28. The BSF verifies the TID to UID mapping and the NAF_id_Zn to NAF_id_Ua mapping. The NAF_id_Ua can be obtained for example from the origin-host AVP. In other words, the BSF checks that the NAF identified by the internal address is authorised to use the external address. If these verifications are successful, the BSF derives the Ks_NAF using the NAF_id_UA.

In step 2a, the BSF sends the Ks_NAF and NAF specific user security settings "USS" to the NAF 29. In some embodiments of the present invention, the NAF may not have any USS and thus the USS AVP is optional. After receiving the Ks_NAF, the NAF can complete the authentication procedure and assume that the UID is correct. If the TID can not be found and either the TID-to-UID or NAF_id_UA validation fails, the BSF shall return an error message to the NAF.

In the case where the NAF is authorised to verify multiple TID-to-UID mappings, it may send an additional request to the BSF in step 3a which contains the TID and another UID. Upon receiving the TID and UID, the BSF 28 shall verify the TID-to-UID mapping and return the result to the NAF 29. This takes place in step 4a. The BSF shall only do this if the NAF is authorised to verify multiple TID-to-UID mappings. In this case, the NAF may repeat steps 3a and 4a multiple times.

Figure 3:
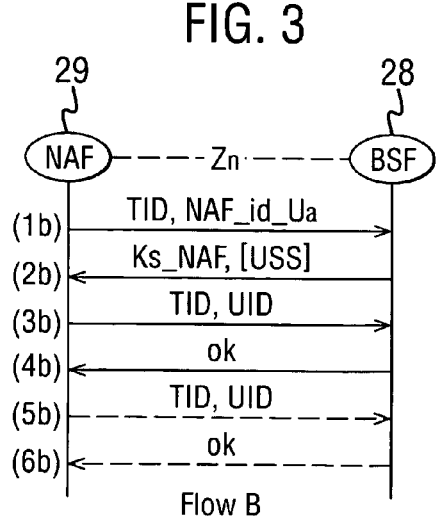
FIG. 3 shows a second signal flow in another embodiment of the invention.

Reference is now to FIG. 3 which shows the case where the TID and UID have been received in different messages. For example, the TID is sent to the NAF for the UID.

In step 1b, the NAF 29 sends the TID and NAF_ID_Ua to the BSF. The BSF shall verify the NAF_id_Zn to NAF_id_Ua mapping. If this verification succeeds, the BSF derives the Ks_NAF using the NAF_id_Ua.

In step 2b, the BSF sends the Ks_NAF and the NAF specific USS to the NAF. Again, the NAF may not have USS and thus the USS AVP is optional. After receiving the Ks_NAF, the NAF 29 can complete the authentication procedure. If a TID can not be found or the NAF_id_Ua validation fails, the BSF 28 returns an error message to the NAF.

Before step 3b, the NAF has received a UID from the user equipment. In step 3b, the NAF sends a TID and UID for verification. The BSF provides the result of this verification in step 4b. This procedure is the same as in messages 3a and 4a of FIG. 2. In this case, the NAF is allowed to verify the TID-to-UID mapping in a separate message. During steps 1b and 2b no UID was verified. In the case where the NAF is authorised to verify multiple TID-to-UID mapping, it can send another request to the BSF in step 5b and get the results of the verification in step 6b. These steps correspond to steps 4a and 4b of FIG. 2. Steps 5b and 6b may be repeated a plurality of times. An error message is sent from the BSF to the NAF if the TID is not found in the BSF database, if mapping of the NAF_id_Ua and NAF_id_Zn could not be verified or if mapping of TID and UID could not be verified.

Thus embodiments of the present invention allow the NAF to send the NAF identifier used by the user equipment over the UA interface to the BSF so that the BSF is able to derive the Ks_NAF.

The invention claimed is:

1. A method comprising:
receiving a first network application function identity information at a boot strapping server function from a network application function, the first network application function identity information corresponding to a public identifier of the network application function, the public identifier comprising a public host name;
receiving a second network application function identity information at the boot strapping server function from the network application function, the second network application function identity information corresponding to an internal identifier of the network application function, the internal identifier comprising a network application function identifier;
verifying, by the boot strapping server function, that the first network application function identity information and the second network application function identity information are bound to identify the network application function; and
generating, by the boot strapping server function if the verifying is successful, a key derived from one of the first network application function identity information and the second network application function identity information, the boot strapping server function implemented in at least one processor.

2. A method as claimed in claim 1, wherein one of the first network application function identity information and the second network application function identity information comprises a public identity.

3. A method as claimed in claim 1, wherein one of the first network application function identity information and the second network application function identity information comprises a private identity.

4. A method as claimed in claim 1 wherein the receiving the first network application function identity information comprises receiving a transaction identifier in a same message as the first network application function identity information.

5. A method as claimed in claim 1, wherein the receiving the first network application function identity information comprises receiving a transaction identifier in a different message from the first network application function identity information.

6. A method as claimed in claim 1, wherein the key comprises an authentication key.

7. A method as claimed in claim 1, further comprising sending the key to the network application function.

8. A method as claimed in claim 1, wherein the generating is only performed if the verifying is successful.

9. A method as claimed in claim 1, wherein if the verifying step is unsuccessful, sending of an error message to the network application function is performed.

10. A method as claimed in claim 1, comprising verifying a transaction identifier to user identifier mapping.

11. A method as claimed in claim 10, wherein a plurality of transaction identifiers are mapped to a user identifier and the verifying is performed in turn for each transaction identifier to user identifier mapping.

12. A method as in claim 1, wherein the key comprises authentication information for an application-specific protocol run by the network application function.

13. A method comprising:
receiving, at a bootstrapping server function from a network application function, a first network application identity information, the first network application function identity information representing at least one of a plurality of public identifiers of the network application function, the at least one of the plurality of public identifiers comprising a public host name of the network application function;
receiving, at the bootstrapping server function from the network application function, a second network application function identity information comprising a network application function identifier of the network application function;
verifying, by the boot strapping server function, that the first network application function identity information and the second network application function identity information are bound to authorize the network application function to use the first network application identity information; and
generating, by the boot strapping server function if the verifying is successful, a key derived from at least one of the first network application function identity information and the second network application function identity information, the boot strapping server function implemented in at least one processor.

14. An apparatus, comprising:
a checker configured to receive a first identity of a network application function and a second identity of the network application function, the second identity being received from the network application function, the first identity identifying a public identifier of the network application function, the public identifier comprising a public host name, the second identity identifying an internal identifier of the network application function, the internal identifier comprising a network application function identifier,
wherein the checker is configured to verify that the first and second identities both belong to the network application function and to generate a key from one of the first and second identities, wherein the checker comprises a boot strapping server function.

15. An apparatus as claimed in claim 14, wherein the checker is configured to generate the key from the second identity.

16. An apparatus as claimed in claim 14, wherein one of the first and second identities comprises a public identity.

17. An apparatus as claimed in claim 14, wherein one of the first and second identities comprises a private identity.

18. An apparatus as claimed in claim 14, wherein the checker is configured to receive the first identity from a user equipment.

19. An apparatus as claimed in claim 14, wherein the checker is configured to receive a transaction identifier in a different message as the first identity.

20. An apparatus as claimed in claim 14, wherein the key comprises an authentication key.

21. An apparatus as claimed in claim 14, further comprising a transmitter configured to send the key to the network application function.

22. An apparatus as claimed in claim 14, wherein the checker is configured to generate the key only if is verified that the first and second identities both belong to the network application function.

23. An apparatus as claimed in claim 14, wherein the checker is configured to send an error message to the network application function if it is determined that the first and second identities do not both belong to the network application function.

24. An apparatus as claimed in claim 14, wherein the checker is configured to verify a transaction identity to user identifier mapping.

25. An apparatus as claimed in claim 24, wherein the checker is configured to map a plurality of transaction identifiers to a user identifier, and to perform said verification in turn for each transaction identifier to user identifier mapping.

26. An apparatus as claimed in claim 14, wherein the apparatus comprises a boot strapping function.

27. A network application function, comprising: at least one processor configured to send a second identity to a boot strapping server function and to receive a key, generated from the second identity, from the boot strapping server function, a first identity corresponding to a public identifier of the network application function, the public identifier corresponding to a public host name, the second identity identifying an internal identifier of the network application function, the internal identifier comprising a network application function identifier.

28. A network application function as claimed in claim 27, wherein one of the first and second identities comprises a public identity.

29. A network application function as claimed in claim 27, wherein one of said first and second identities comprises a private identity.

30. A network application function as claimed in claim 27, wherein the key comprises an authentication key.

31. A network application function as claimed in claim 27, wherein said receiver is configured to receive an error message from a checker if it is determined that the first and second identities do not both belong to the network application function.

32. A method comprising:
receiving, at a boot strapping function from a network application function, an internal interface address, the boot strapping server function implemented in at least one processor;
receiving, at the boot strapping function, an external interface address, the external interface address comprising a public identifier of the network application function, the public identifier comprising a public host name, the internal interface address corresponding to an internet protocol address identifying an internal interface of the network application function; and
verifying that the external interface address and the internal interface address are bound to the network application function.

33. A non-transitory computer readable medium including a computer program which when executed by a processor provides operations comprising:
receiving a first identity information of a network application function at a boot strapping server function, the first identity information corresponding to a public identifier of the network application function, the public identifier comprising a public host name;
receiving a second identity information of the network application function at the boot strapping server function from the network application function, the second identity information corresponding to an internal identifier of the network application function, the internal identifier comprising a network application function identifier;
verifying that the first and the second identities are bound to the network application function; and
generating a key using one of the first and second identity information.

34. A non-transitory computer readable medium including a computer program which when executed by a processor provides operations comprising:
receiving an internal interface address at a boot strapping function from a network application function or from a user equipment;
receiving an external interface address at the boot strapping function from the network application function, the external interface address comprising a public identifier of the network application function, the public identifier comprising a public host name, the internal interface address comprising a network application function identifier identifying an internal interface of the network application function; and
verifying that the external interface address and the internal interface address are bound to the network application function.

* * * * *